United States Patent
Kuchi (10) Patent No.: US 10,873,370 B2
(45) Date of Patent: Dec. 22, 2020

(54) METHOD AND SYSTEM FOR ENABLING EXPLICIT CHANNEL STATE INFORMATION (CSI) FEEDBACK IN MULTIPLE-INPUT-MULTIPLE-OUTPUT (MIMO)

(71) Applicant: WiSig Networks Private Limited, Telangana (IN)

(72) Inventor: Kiran Kumar Kuchi, Telangana (IN)

(73) Assignee: WISIG NETWORKS PRIVATE LIMITED

( * ) Notice: Subject to any disclaimer, the term of this patent is extended or adjusted under 35 U.S.C. 154(b) by 0 days.

(21) Appl. No.: 16/346,670

(22) PCT Filed: Nov. 3, 2017

(86) PCT No.: PCT/IN2017/050508
§ 371 (c)(1),
(2) Date: May 1, 2019

(87) PCT Pub. No.: WO2018/083714
PCT Pub. Date: May 11, 2018

(65) Prior Publication Data
US 2020/0067573 A1  Feb. 27, 2020

(30) Foreign Application Priority Data
Nov. 3, 2016  (IN) .............................. 201641036296

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0456* (2013.01); *H04L 5/0053* (2013.01); *H04L 5/14* (2013.01); *H04W 72/0413* (2013.01)

(58) Field of Classification Search
CPC .. H04B 7/0417; H04B 7/0456; H04B 7/0626; H04L 5/0053; H04L 5/14; H04L 5/0057;
(Continued)

(56) References Cited

U.S. PATENT DOCUMENTS

| 2015/0244443 A1 | 8/2015 | Papasakellariou et al. |
| 2016/0164588 A1 | 6/2016 | Chen |

(Continued)

*Primary Examiner* — Fitwi Y Hailegiorgis
(74) *Attorney, Agent, or Firm* — McAndrews, Held & Malloy, Ltd.

(57) ABSTRACT

Embodiments of the present disclosure discloses a method for enabling CSI feedback in Multiple Input Multiple Output (MIMO) wireless communication system comprising at least one user equipment (UE) and at least one base station (BS). The UE receives a plurality of downlink (DL) channel state information CSI from the BS and generate an explicit CSI from the received DL CSI. The UE determines a range of frequency domain values and channel state values from the received DL CSI. Upon determination, the UE performs IDFT to determine time domain channel impulse response matrices for the range of frequency domain values and perform CSI quantization. In another embodiment, the processor performs CSI quantization on either full range or a partial range of the time domain channel impulse response matrices to obtain optimized time domain channel explicit CSI and transmit the generated explicit CSI as a feedback to the one or more BS.

26 Claims, 3 Drawing Sheets

(51) Int. Cl.
*H04L 5/00* (2006.01)
*H04L 5/14* (2006.01)
*H04W 72/04* (2009.01)

(58) Field of Classification Search
CPC ... H04L 5/0023; H04L 1/0035; H04L 1/0026; H04W 72/0413
USPC .................................................. 375/260, 267
See application file for complete search history.

(56) References Cited

U.S. PATENT DOCUMENTS

2016/0359538 A1* 12/2016 Onggosanusi ........ H04L 5/0057
2018/0262253 A1* 9/2018 Rahman ............... H04B 7/0478

* cited by examiner

METHOD AND SYSTEM FOR ENABLING EXPLICIT CHANNEL STATE INFORMATION (CSI) FEEDBACK IN MULTIPLE-INPUT-MULTIPLE-OUTPUT (MIMO)

TECHNICAL FIELD

Embodiments of the present disclosure are related, in general to communication, but exclusively relate to method and communication system for enabling channel state information feedback in Multiple-Input-Multiple-Output (MIMO)/Cloud Random Access Network (RAN).

BACKGROUND

Existing systems employ orthogonal frequency division multiplexing (OFDM) and the channel may potentially change every subcarrier. Feeding back the frequency domain channel back to a base station (BS)/cloud for every subcarrier results in high feedback overhead. In few existing systems, a channel matrix that comprises a Nr×Nt channel matrix, where Nr denotes receiver antennas and Nt denotes transmit antennas/streams, corresponding to a subcarrier is quantized at low resolution to reduce the feedback overhead. Usually, the channel matrix is not directly quantized but another precoder matrix that is related to the channel matrix is quantized.

In few other existing systems, the system assumes that the CSI varies slowly in frequency domain and feedback the precoder V for a group of subcarriers to reduce the feedback overhead. Typically, this group comprises of a sub-band or multiple sub-band. Low resolution feedback coupled with a single CSI metric for a sub-band or multiple sub-bands results in significant inter stream-user interference between the MU MIMO/cloud RAN transmissions.

In some other existing systems that use distributed antennas (such as cloud RAN), it may not be possible to estimate the CSI between the BS/cloud antennas. In such cases, one may use a method called explicit channel calibration. In this case, the user feedbacks the downlink CSI back to the BS/cloud, BS/cloud further obtains uplink CSI using uplink sounding signals transmitted from single or multiple users. The calibration coefficients may be derived from the explicit knowledge of downlink and uplink CSI. In subsequent transmissions, the downlink CSI can be obtained from periodic/a-periodic sounding signals transmitted by a single or multiple user and using the estimates of the calibration coefficients that typically vary slowly in time, in the order of 30 minutes or hours depending on temperate fluctuations. There is a need to acquire full channel matrix of the user at the BS/cloud for explicit channel calibration purposes. The explicit CSI feedback is preferably obtained for every subcarrier or nearby subcarriers over which the channel does not exhibit significant variation. Therefore, there is a need for a method and a system for enabling CSI feedback in Multiple Input Multiple Output (MIMO) wireless communication system.

SUMMARY

The features and advantages realized through the techniques of the present disclosure are brought out. Other embodiments and aspects of the disclosure are described in detail herein and are considered a part of the claimed disclosure.

The shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Embodiments of the present disclosure discloses a method for enabling CSI feedback in Multiple Input Multiple Output (MIMO) wireless communication system comprises receiving a plurality of downlink (DL) channel state information CSI from one or more base stations (BS), generating an explicit CSI from the received DL CSI and transmitting the generated explicit CSI as a feedback to the one or more BS.

Another aspect of the present disclosure relates to a user equipment (UE) for enabling CSI feedback in Multiple Input Multiple Output (MIMO) wireless communication system. In one embodiment, the UE comprises a processor, and a memory communicatively coupled to the processor. The UE further comprises at least one transceiver coupled to the processor and the memory, comprising at least one receiver and at least one transmitter. The processor is configured to receive an information associated with downlink (DL) channel state information CSI from one or more base stations (BS) coupled with the UE and generate an explicit CSI from the received DL CSI. Upon generation, the UE transmit the generated explicit CSI as a feedback to the one or more BS.

It is to be understood that the aspects and embodiments of the invention described above may be used in any combination with each other. Several of the aspects and embodiments may be combined together to form a further embodiment of the invention.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

Time division duplex (TDD) systems uses same channel bandwidth (BW) in both downlink and uplink. A base station (BS), also referred as cloud may use channel reciprocity principle to acquire channel state information (CSI) at the BS or cloud. The channel reciprocity implies that the downlink propagation channel takes same values in the uplink for any transmit and receive antenna pairs. Though propagation channel is reciprocal, radio frequency (RF) filters used in the downlink RF chain are usually distinct from the uplink.

The RF filters makes the downlink CSI distinct from uplink CSI. If the BS or cloud can estimate at least one of an impulse response and frequency domain response of these RF filters explicitly, then downlink CSI may be estimated from uplink CSI measurements by scaling the frequency domain uplink CSI with a correction factor/calibration coefficient. This process is usually known as channel calibration. There are some known CSI calibration methods, such as allowing wireless communication between the antennas of the BS/cloud and uses the CSI between the BS/cloud antennas to derive the calibration coefficients.

In systems that use distributed antennas (such as cloud RAN), it is possible to estimate the CSI between the BS/cloud antennas using explicit channel calibration. In this case, the user feedback the downlink CSI back to the BS/cloud, BS/cloud further obtains uplink CSI using uplink sounding signals transmitted from single or multiple users. The calibration coefficients may be derived from the explicit knowledge of downlink and uplink CSI. In subsequent transmissions, the downlink CSI can be obtained from periodic/a-periodic sounding signals transmitted by a single or multiple user and using the estimates of the calibration coefficients that typically vary slowly in time, in the order of 30 minutes or hours depending on temperate fluctuations. There is a need to acquire full channel matrix of the user at the BS/cloud for explicit channel calibration purposes. The explicit CSI feedback is preferably obtained for every sub-carrier or nearby subcarriers over which the channel does not exhibit significant variation. The present disclosure resolves issue of acquiring CSI at the BS or cloud, so that multiple users may be served in the downlink without mutual interference caused by down transmissions.

Figure 1:
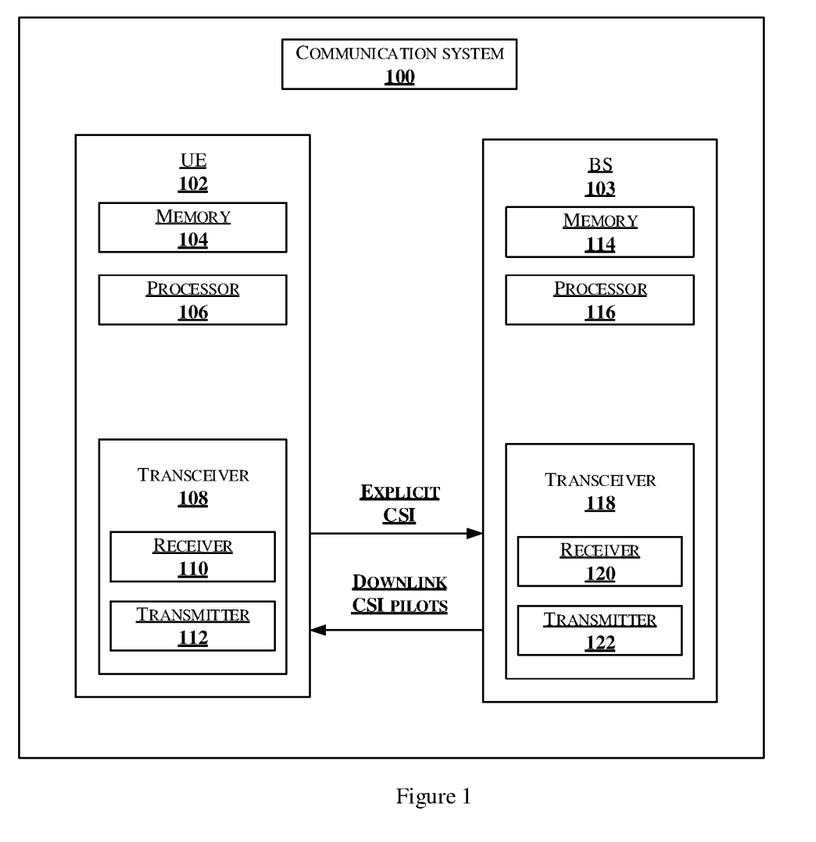
FIG. 1 shows an illustration of a block diagram of a communication system, in accordance with an embodiment of the present disclosure.

FIG. 1 shows a block diagram of a communication system 100 in accordance with an embodiment of the present disclosure.

As shown in the FIG. 1, the communication system 100 includes UE 102 and BS 103. The UE 102 includes a memory 104 and a processor 106. The memory 104 may be communicatively coupled to the processor 106. The processor 106 may be configured to perform one or more functions of the UE 102 for generating explicit CSI. The UE 102 include a transceiver 108 that further comprises at least one transmitter 110 and at least one receiver 112. The BS 103 includes a memory 114 and a processor 116. The memory 114 may be communicatively coupled to the processor 116. The processor 116 may be configured to perform one or more functions of the BS 103 for interpolating explicit CSI.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one embodiment, the UE 102 receives downlink (DL) channel state information CSI from one or more base stations (BS) 103. let $H_{k,i}$ denote the DL CSI in frequency domain where the index take values in the range k=0, 1, 2, . . . N−1, N being the largest frequency index of interest and i=1, 2, ... L denotes the CSI matrices corresponding to different BSs/RRHs 103. The UE 102 may select the best LBSs/RRHs 103 based on the highest power. The power measurement may be done semi-statically using CSI pilots.

The size of the CSI matrices is based on the number of transmitter 112 and receiver 110 antenna ports at each BS/RRH 103 and the number of transceiver 108 antenna ports, at the UE 102. The elements of a given CSI matrix correspond to the channel state between the transmitter 112 and receiver 110 antenna ports between a BS/RRH 103 and the UE 102.

In one embodiment, the UE 102 provides a feedback which is the explicit frequency domain CSI corresponding to at least one of the number of BSs/RRHs 103 for every frequency index, and a subset of frequency indices. Using the known CSI values, the BS/cloud 103 interpolates the CSI values of all frequency indices of interest. The explicit CSI feedback may be performed for sub-bands of interest or full wideband.

Figure 2:
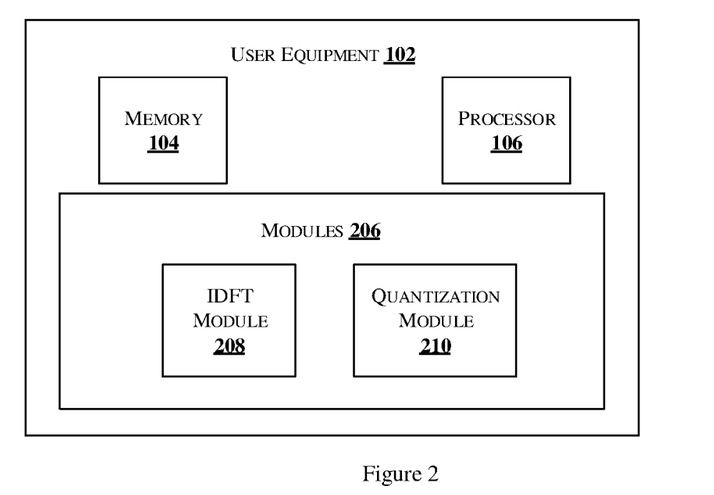
FIG. 2 shows an illustration of an of a block diagram of a user equipment of FIG. 1, in accordance with an embodiment of the present disclosure.

FIG. 2 shows an illustration of a block diagram of a user equipment of FIG. 1.

In an embodiment, the user equipment (UE) 102 comprises the processor 106 and one or more modules 206. In one implementation, the one or more modules 206 may be stored in the memory 104. The modules 106 may include, without limiting to, an IDFT module 206, and a Quantization module 208.

The UE 102 receives the downlink CSI from the one or more BS 103 and generates an explicit CSI based on the received downlink CSI. In one embodiment, the IDFT module 208 receives the downlink CSI in frequency domain and performs an inverse discrete Fourier Transform (IDFT) to generate the explicit CSI in time domain. For example, the IDFT module 208 receives the downlink CSI $H_{k,i}$ and performs IDFT to generate the time domain channel impulse response $H_{t,l}$ as illustrated in equation (1) below:

$$H_{t,l,i} = \sum_{k=0}^{N-1} H_{k,i} e^{\frac{j2\pi kl}{N}} \quad (1)$$

As illustrated in equation (1), the index 'l' denotes the time domain values that take values in the range l=0, 1, 2, ... N−1 and $H_{t,l}$ denote the time domain channel impulse response. The index l is also referred as lth tap filter.

In one embodiment, the UE 102 may provide the explicit CSI feedback such as, but not limited to one of frequency domain channel states and time domain channel states. For frequency selective channels, the frequency domain channel varies slowly with each subcarrier index k. Explicitly feeding back the channel corresponding to each value of k may result in significant feedback overhead. A method of compression is required to reduce the feedback overhead. In typical channels of interest, the time domain channel takes significant value only for a limited range of values of l. A significant reduction in feedback overhead can be obtained, if the user feeds back the time domain channel. For this purpose, the UE 102 determines the range of values of l for which the time domain channel values are significant and feedback the channel states for the respective range of values.

The physical propagation channel results in channel taps at certain discrete time locations, in one embodiment. However, the length of DFT and IDFT depends on system parameters. In one embodiment, the CSI in time domain taps after IDFT, which includes the effects of sinc interpolation. Therefore, the time domain channel taps include correlated channel fading effects. Further, the sinc interpolation results in increasing the length of impulse responses in time domain. This requires truncation of the impulse response to a suitable length resulting in rectangular windowing operation performed by the quantization module 210.

The quantization module 210 determines window length based on the power of the CSI channel tap values. In one embodiment, the BS/cloud 103 may signal a power threshold to the UE 102. In another embodiment, the UE 102 may choose a random power threshold value. Based on the power threshold value, the UE 102 may set the window duration.

Figure 3:
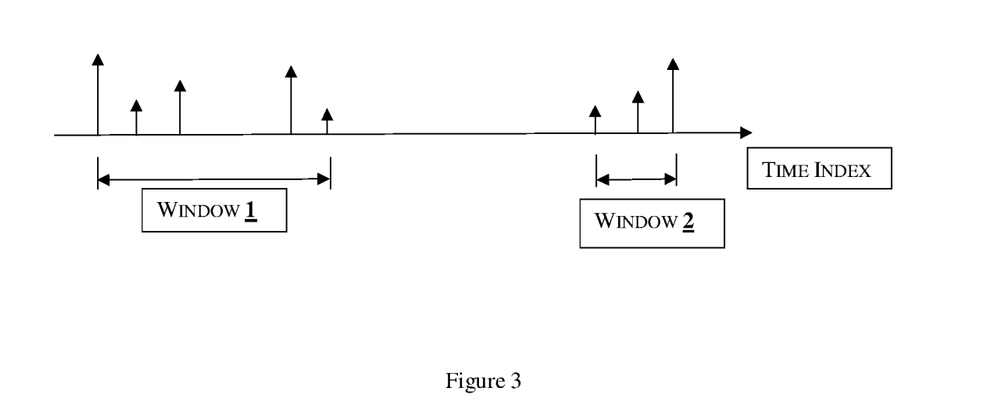
FIG. 3 shows an illustration of a time domain channel window along with a time index, in accordance with an embodiment of the present disclosure.

FIG. 3 shows an illustration of a time domain channel window along with a time index, in accordance with an embodiment of the present disclosure. In one embodiment, the UE 102 may define a time domain channel window with starting time index of $l_s$ and ending index $l_e$ and feedback the quantized channel states, starting index, and the window length, as shown in FIG. 1. The quantization should be carried such that both the magnitude and phase values of the frequency domain channel values can be obtained by the BS/cloud 103 to the desired accuracy level.

In another embodiment, the quantization module 210 of UE 102 defines multiple windows over which the CSI takes significant values. The channel tap values outside of the window is assumed to be zero. The UE 102 transmits the CSI feedback over the duration of the window, the window length and indices to indicate the start and end points of the windows.

The quantization module 210 determines that if CSI or power contained in the CSI, measured using a metric for example, sum of squared norms of individual elements of CSI matrix, for any time index falls below a certain threshold (weak channel taps), then the quantization module 210 determines the CSI values equal to zero and transmit a zero value CSI feedback to the BS 103. This type of feedback method can be applied to feedback the CSI corresponding to the one or more BSs/RRH 103 that UE 102 needs to feedback.

In one embodiment, the quantization module 210 assigns matrix values as CSI corresponding to co-located multiple antennas of a BS or RRH and multiple antennas of the UEs 102. In such implementation, one of time domain and frequency domain elements of the channel matrix are feedback to the BS/cloud 103. For this case, time domain window lengths may be same for every element of the CSI matrix.

In another embodiment, the quantization module 210 assigns matrix values as CSI corresponding to both co-located and distributed multiple antennas of a BS or RRH 103 and multiple antennas of the users. For this, the time domain windows may be same for every element of CSI matrix corresponding to the BS/RRH 103. The time domain windows may be different for different BS/RRHs 103.

In one embodiment, the UE 102 may have multiple antennas. However, the UE 102 identifies and indicates a subset of antenna ports to the BS/cloud 103. The BS/cloud 103 requests the explicit feedback of the CSI for the wideband or sub-band, or a set of sub-bands. The UE 102 provides the explicit CSI feedback in time domain or frequency domain to the identified subset of antenna ports of the BS/cloud 103. The time domain windows may be one of same for each sub-band and different for different sub-bands.

The quantization module 210 of the UE 102 performs CSI quantization to generate the explicit CSI as feedback to the one or more identified BS/cloud 103. In one embodiment, the UE 102 estimates the channel states of one or more BS/RRH 103 using DL CSI pilots. The BS/RRH 103 determines number of active RRHs/BSs 103 and associated IDs/port numbers and communicates to the UE 102 using for example, at least one of a user specific control channel message and a MAC message. In another embodiment, the UE 102 determines the number of active RRHs/BSs 103 and associated IDs/port numbers by performing cell search operation as some of the BSs/RRH 103 may use different synchronization sequences.

The UE 102 determines the CSI matrices corresponding to the transmit/receiver ports of a BS/RRH 103 and UE pairs for number of active BS/RRHs 103. The UE 102 determines a best L BS/RRHs 103 having highest signal level and ranks the BS/RRHs 103 in the order of decreasing/increasing power. Upon performing the estimation step (over time), the UE 102 may conduct CSI estimation for the best L BSs/RRH 103. However, the best BS/RRH 103 list may change over time due to mobility. In another embodiment, the UE 102 may increase the search space to refine the identification of best BS/RRH 103. In one example, the search may be preferably performed for a longer period, for example every 100 frames or so. Upon determining the best L BSs/RRHs 103, the UE 102 estimates the CSI matrices of these BSs/RRHs 103.

The UE 102 may communicate the estimated CSI to one of all L BSs/RRHs 103 and a subset of L BSs/RRHs 103. The UE 102 communicates the quantized CSI to all or subset of L BSs/RRHs 103. In one embodiment, the quantization module 210 performs quantization of real and imaginary parts of the elements of the time/frequency domain CSI matrix corresponding to a number of BSs/RRHs 103 separately using certain number of bits before transmission to BS/cloud 103. The CSI corresponding to a BS/RRH 103 may be one of a scalar and a matrix. The size of the matrix depends on the number of antenna ports used by the BS/RRH 103 and the UE 102.

In another embodiment, the quantization module 210 performs quantization of the magnitude and phase values of the elements of the time/frequency domain CSI matrix corresponding to the number of BSs/RRHs 103 separately using certain number of bits before transmission to BS/cloud 103. The number of bits allocated for quantization may be unequal for different BS/RRHs 103. The BS/RRHs 103 with highest received power may be quantized at higher resolution as compared to weaker BS/RRH 103.

In one embodiment, the UE 102 quantizes each Hi using Bi bits. The number of bits Bi for i=1, 2, ... Ls, may be equal or unequal. Let Ls indicate a subset. The UE 102 allocates more bits for a CSI matrix that corresponds to a BS/RRH 103 with higher power. Therefore, the number of allocated bits may decrease with i. In one embodiment, a first group of CSI matrices are quantized using b1 bits and a second group is quantized using b2 bits and so on. The CSI matrices within each group may be quantized individually or jointly.

In one embodiment, the number of quantization bits allocated to different time domain CSI channel taps of a BS/cloud 103 may be one of same and different. The strong channel taps may be quantized at high resolution and weak channel taps may be quantized at low resolution.

In one embodiment, the UE 102 feeds back CSI matrices Ls explicitly and only the interference power associated with the remaining L-Ls BSs/RRHs 103 is feedback to the BS/cloud 103. The interference power may be the sum of total interference power of L-Ls BSs/RRHs 103. The interference power may be quantized using certain number of bits. The interference report is send either periodically or a-periodically.

In one embodiment, the CSI feedback is done at high resolution so that BS/RRHs 103 can use the CSI feedback for TDD channel calibration. In another embodiment, the CSI feedback is done at moderate resolution so that BS/RRHs 103 can use the CSI information for precoding the data in a FDD system.

In an embodiment, the explicit CSI feedback may be used to apply a linear or non-linear precoder such as for example, a Tomlison Harashima Precoder (THP) for MU MIMO or cloud RAN. In another embodiment, the UE 102 may feedback the residual-noise-plus interference (NPI) values for a sub set of bands, subcarriers or for the wideband so that the knowledge of explicit CSI or the diagonal elements of the effective channel after linear or non-linear precoding and NPI can be used to determine the modulation and coding scheme to be allocated to individual data streams or users.

Figure 4:
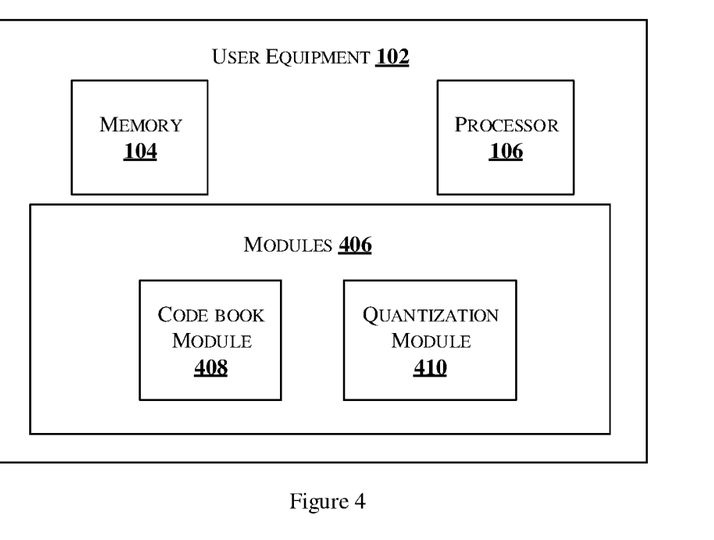
FIG. 4 shows an illustration of a block diagram of the user equipment of FIG. 1, in accordance with another embodiment of the present disclosure.

FIG. 4 shows an illustration of a block diagram representation of the UE 102.

In an embodiment, the user equipment (UE) 102 comprises the processor 106 and one or more modules 406. In one implementation, the one or more modules 406 may be stored in the memory 104. The UE 102 receives the downlink CSI from the one or more BS 103 and generates an explicit CSI based on the received downlink CSI. In an embodiment, the downlink (DL) channel state information may be processed by one or more modules 406 of the UE 102. The modules 406 may include, without limiting to, a codebook module 408 and a Quantization module 410.

One embodiment of the present disclosure is a frequency domain code book based explicit CSI feedback. Let, $H_k = U_k \Sigma_k V_k^*$ denote the singular-value-decomposition (SVD) of a given CSI matrix of a BS/RRH 103. Here the symbol (*) denotes matrix conjugate-transpose operation. The UE 102 may perform the following operations. The Quantization module 410 quantizes the individual matrices $U_k$, $V_k^*$ using a code book from the codebook module 408 and elements of $\Sigma_k$ using some number of bits. Further, applying quantization to every frequency index or a subset of frequency indices. For example, providing feedback CSI matrix every 3 indices or 4 indices and the BS/cloud 103 interpolates the CSI for remaining frequency indices.

In another embodiment, MU MIMO communication using linear precoding may be implemented at BS/cloud 103 using knowledge of $V_k^*$ or $V_k$ at each UE 102. In this case, the UE 102 quantizes only $V_k^*$ or $V_k$ using a code book. In one embodiment, the UE 102 quantizes the frequency domain CSI using equal or unequal number bits per BS/RRH 103. In one embodiment, the UE 102 allocates more bits for a CSI matrix that corresponds to a BS/RRH 103 with higher power.

Figure 5:
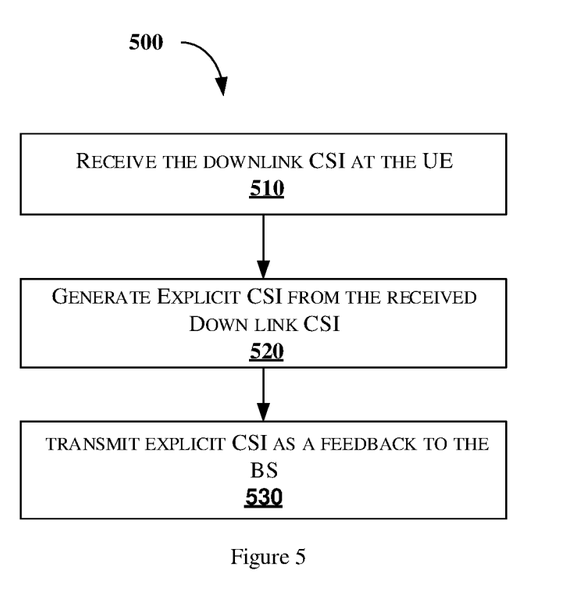
FIG. 5 shows a flowchart illustrating a method for enabling CSI feedback in Multiple Input Multiple Output (MIMO) wireless communication system in accordance with some embodiments of the present disclosure.

FIG. 5 shows a flowchart illustrating a method for enabling CSI feedback in Multiple Input Multiple Output (MIMO) wireless communication system.

As illustrated in FIG. 5, the flowchart 500 comprises one or more steps or blocks performed by the UE 102 illustrating a method for enabling CSI feedback in Multiple Input Multiple Output (MIMO) wireless communication system in accordance with an embodiment of the present disclosure.

The order in which the method 500 is described is not intended to be construed as a limitation, and any number of the described method blocks can be combined in any order to implement the method. Additionally, individual blocks may be deleted from the methods without departing from the spirit and scope of the subject matter described herein.

Furthermore, the method can be implemented in any suitable hardware, software, firmware, or combination thereof.

At block 510, a plurality of downlink (DL) channel state information CSI is received from one or more base stations (BS) 103.

In one embodiment, the UE 102 receives downlink (DL) channel state information CSI from one or more base stations (BS) 103. let $H_{k,i}$ denote the DL CSI in frequency domain where the index take values in the range k=0, 1, 2, ... N−1, N being the largest frequency index of interest and i=1, 2, ... L denotes the CSI matrices corresponding to different BSs/RRHs 103. The UE 102 may select the best LBSs/RRHs 103 based on the highest power. The power measurement may be done semi-statically using CSI pilots.

The size of the CSI matrices is determined based on the number of antenna ports at each BS/RRH 103 and the number of antenna ports, at the UE 102. The elements of a given CSI matrix correspond to the channel state between the transmit and receiver antenna ports between a BS/RRH 103 and the UE 102.

At block 520, an explicit CSI is generated from the received DL CSI.

The IDFT module 208 performs an inverse discrete Fourier Transform (DFT) on $H_{k,i}$ and $$H_{t,l,i} = \sum_{k=0}^{N-1} H_{k,i} e^{\frac{j2\pi kl}{N}}$$

is obtained. Where the index l denotes the time domain values that take values in the range l=0, 1, 2, ... N−1 and $H_{t,l}$ denote the time domain channel impulse response. The index l is also referred as lth tap.

In one embodiment, the UE 102 may provide feedback such as, but not limited to one of frequency domain channel states and time domain channel states. For frequency selective channels, the frequency domain channel varies slowly with each subcarrier index k. Explicitly feeding back the channel corresponding to for each value of k may result in significant feedback overhead. A method of compression is required to reduce the feedback overhead. In typical channels of interest, the time domain channel takes significant value only for a limited range of values of l. A significant reduction in feedback overhead can be obtained, if the user feeds back the time domain channel. For this purpose, the UE 102 determines the range of values of l for which the time domain channel values are significant and feedback the channel states for these values only.

The physical propagation channel results in channel taps at certain discrete time locations, in one embodiment. However, the length of DFT and IDFT depends on system parameters. In one embodiment, the CSI in time domain taps after IDFT, which includes the effects of sinc interpolation. Therefore, the time domain channel taps include correlated channel fading effects. Further, the sinc interpolation results in increasing the length of impulse responses in time domain. This requires truncation of the impulse response to a suitable length resulting in rectangular windowing operation performed by the quantization module 210.

The quantization module 210 determines window length based on the power of the CSI channel tap values. In one embodiment, the BS/cloud 103 may signal a power threshold to the UE 102. In another embodiment, the UE 102 may choose a random power threshold value. Based on the power threshold value, the UE 102 may set the window duration.

In one embodiment, the UE 102 may define a time domain channel window with starting time index of $l_s$ and ending index $l_e$ and feedback the quantized channel states, starting index, and the window length, as shown in FIG. 1. The quantization module 210 performs CSI quantization such that both the magnitude and phase values of the frequency domain channel values can be obtained by the BS/cloud 103 to the desired accuracy level.

Let, $H_k = U_k \Sigma_k V^*_k$ denote the singular-value-decomposition (SVD) of a given CSI matrix of a BS/RRH 103. Here the symbol (*) denotes matrix conjugate-transpose operation. In another embodiment, the quantization module 410 quantizes the individual matrices $U_k$, $V^*_k$ using a code book from the codebook module 408 and elements of $\Sigma_k$ using some number of bits. Further, the quantization module 410 performs quantization to every frequency index or a subset of frequency indices. For example, providing feedback CSI matrix every 3 indices or 4 indices and the BS/cloud 103 interpolates the CSI for remaining frequency indices. In another embodiment, MU MIMO communication using linear precoding may be implemented at BS/cloud 103 using knowledge of $V^*_k$ or $V_k$ at each UE 102. In this case, the UE 102 quantizes only $V^*_k$ or $V_k$ using a code book.

In one embodiment, the UE 102 quantizes the frequency domain CSI using equal or unequal number bits per BS/RRH 103. In one embodiment, the UE 102 allocates more bits for a CSI matrix that corresponds to a BS/RRH 103 with higher power.

At block 530, the generated explicit CSI is transmitted as a feedback to the one or more BS.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for enabling channel state information (CSI) feedback in Multiple Input Multiple Output (MIMO) wireless communication system, the method comprising:
   receiving, by a user equipment (UE), a plurality of downlink (DL) reference signals from one or more base stations (BSs), wherein DL CSI is obtained from the DL reference signals;
   generating, by the UE, an explicit CSI from the DL CSI, wherein generating the explicit CSI comprises performing CSI quantization on individual DL CSI matrices using at least one or more of a codebook and a set of precoder matrices; and transmitting, by the UE, the generated explicit CSI as a feedback to the one or more BSs, wherein the CSI feedback is transmitted to the one or more BSs corresponding to one or more frequency indices.

2. The method as claimed in claim 1, wherein the step of generating explicit CSI comprising:

determining a range of frequency domain values and channel state values associated with the determined range of frequency domain values from the DL CSI;

applying IDFT to determine time domain channel impulse response matrices for the range of frequency domain values thus determined; and performing CSI quantization on either full range or a partial range of the time domain channel impulse response matrices to obtain optimized time domain channel explicit CSI.

3. The method as claimed in claim 2, wherein CSI quantization is performed separately on real and imaginary parts of the elements of the time domain channel impulse response matrices corresponding to one or more BSs using predetermined number of bits before transmission to BS.

4. The method as claimed in claim 2, wherein CSI quantization is performed separately on magnitude and phase values of the elements of the time domain channel impulse response matrices corresponding to one or more BSs using predetermined number of bits before transmission to BS.

5. The method as claimed in claim 4, wherein the predetermined number of bits allocated for quantization may be different for each BS.

6. The method as claimed in claim 1, wherein the explicit CSI feedback is generated using the DL CSI from associated with the one or more BSs identified based on signal power.

7. The method as claimed in claim 1, wherein CSI quantization is performed for the one or more BS with highest signal power at higher resolution.

8. The method as claimed in claim 1, further comprising transmitting interference power information of low signal BSs within the explicit CSI as feedback to the one or more BS.

9. The method as claimed in claim 1, wherein the explicit CSI feedback is transmitted with high resolution to enable TDD (Time Division Duplex) channel calibration at the one or more BSs.

10. The method as claimed in claim 1, wherein the explicit CSI feedback is transmitted with moderate resolution to enable the one or more BSs to use the explicit CSI information for precoding the data in a FDD (Frequency Division Duplex) system.

11. The method as claimed in claim 1, wherein performing CSI quantization comprising quantizing the CSI in frequency domain using one of equal and unequal number of bits allocated to each BS.

12. The method as claimed in claim 1, further comprising determining one or more bits for the DL CSI corresponding to the transmission power of the BS.

13. The method as claimed in claim 1, wherein the set of precoder matrices is used to perform CSI quantization using predetermined number of bits.

14. A user equipment (UE) for enabling channel state information (CSI) feedback in Multiple Input Multiple Output (MIMO) wireless communication system, the UE comprising:

a processor;

a memory communicatively coupled to the processor; and at least one transceiver coupled to the processor and the memory, comprising at least one receiver and at least one transmitter;

wherein the processor is configured to:

receive, via the at least one receiver, one or more downlink (DL) reference signals from one or more base stations (BS) coupled with the UE, wherein DL CSI is obtained from the DL reference signals;

generate an explicit CSI from the received DL CSI by performing CSI quantization on individual DL CSI matrices using at least one or more of a codebook and a set of precoder matrices; and transmit, via the at least one transmitter, the generated explicit CSI as a feedback to the one or more BSs corresponding to one or more frequency indices.

15. The system as claimed in claim 14, wherein the processor is configured to generate explicit CSI by steps comprising:

determining a range of frequency domain values and channel state values associated with the determined range of frequency domain values from the DL CSI;

applying IDFT to determine time domain channel impulse response matrices for the range of frequency domain values thus determined; and performing CSI quantization on either full range or a partial range of the time domain channel impulse response matrices to obtain optimized time domain channel explicit CSI.

16. The system as claimed in claim 15, wherein the processor performs CSI quantization separately on real and imaginary parts of the elements of the time domain channel impulse response matrices corresponding to the one or more BSs using predetermined number of bits before transmission to the one or more BS.

17. The system as claimed in claim 15, wherein the processor is configured to perform CSI quantization separately on magnitude and phase values of the elements of the time domain channel impulse response matrices corresponding to one or more BSs using predetermined number of bits before transmission to BS.

18. The system as claimed in claim 17, wherein the processor allocates a different predetermined number of bits for quantization for each BS.

19. The system as claimed in claim 15, wherein the processor is configured to perform CSI quantization for the one or more BS with highest signal power at higher resolution.

20. The system as claimed in claim 15, wherein the processor is further configured to transmit interference power information of low signal BSs within the explicit CSI as feedback to the one or more BS.

21. The system as claimed in claim 14, wherein the processor is configured to generate the explicit CSI feedback using the DL CSI associated with the one or more BSs identified based on signal power.

22. The system as claimed in claim 14, wherein the transmitter transmits the explicit CSI feedback with high resolution to enable TDD (Time Division Duplex) channel calibration at the one or more BSs.

23. The system as claimed in claim 14, wherein the transmitter transmits the explicit CSI feedback with moderate resolution to enable the one or more BSs to use the explicit CSI for precoding the data in a FDD (Frequency Division Duplex) system.

24. The system as claimed in claim 14, wherein the processor is configured to perform CSI quantization by quantizing the CSI in frequency domain using one of equal and unequal number of bits allocated to each BS.

25. The system as claimed in claim 14, wherein the processor is further configured to determine one or more bits for the DL CSI corresponding to the transmission power of the BS.

26. The system as claimed in claim 14, wherein the set of precoder matrices is used to perform CSI quantization using predetermined number of bits.

\* \* \* \* \*